United States Patent [19]

Fees

[11] 4,195,518
[45] Apr. 1, 1980

[54] ARMORED ROTAMETER

[75] Inventor: Charles E. Fees, Houston, Tex.

[73] Assignee: Fisher & Porter Company, Warminster, Pa.

[21] Appl. No.: 958,416

[22] Filed: Nov. 7, 1978

[51] Int. Cl.² ............................................. G01F 1/24
[52] U.S. Cl. .................. 73/209; 73/DIG. 5; 73/432 A; 116/204
[58] Field of Search ............ 73/3, 208, 209, 210, 73/272 A, 272 R, 431, 432 A, DIG. 5; 116/204, 284, 285

[56] References Cited

U.S. PATENT DOCUMENTS

| | | | |
|---|---|---|---|
| 2,425,691 | 8/1947 | Brewer | 73/209 |
| 3,164,989 | 1/1965 | Busillo et al. | 73/209 |
| 3,315,523 | 4/1967 | Conkling | 73/209 |
| 3,977,248 | 8/1976 | Metzger | 73/209 |
| 4,016,827 | 4/1977 | Lawrence | 116/204 |

*Primary Examiner*—Donald Watkins
*Attorney, Agent, or Firm*—Michael Ebert

[57] ABSTRACT

An armored rotameter capable of accurately measuring low flow rates, the meter including a metal body provided with a bore defining a vertical flow tube having a lower inlet into which a fluid to be metered is admitted and an upper outlet from which the fluid is discharged. Disposed in the flow tube is a float having a guided stem which includes a lateral pin projecting through a slot in the front wall of the meter body, the pin riding up and down the slot as the float moves up and down the tube as a function of flow rate. The pin is coupled to one end of a bar magnet link that is external to the meter body and is swingable about a center pivot, the link being caused to swing to an extent and direction in accordance with float movement. The slot and link are sealed by a pressure plate secured to the front face of the meter body. External to the pressure plate and parallel to the link is a bar magnet pointer swingable about a center pivot in axial alignment with the link pivot, the link and pointer being in magnetically attractive relation whereby as the link swings, its movement is followed by the pointer to provide a flow rate indication on a scale associated therewith.

8 Claims, 5 Drawing Figures

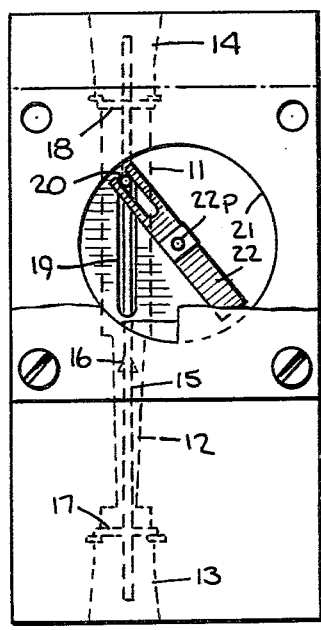
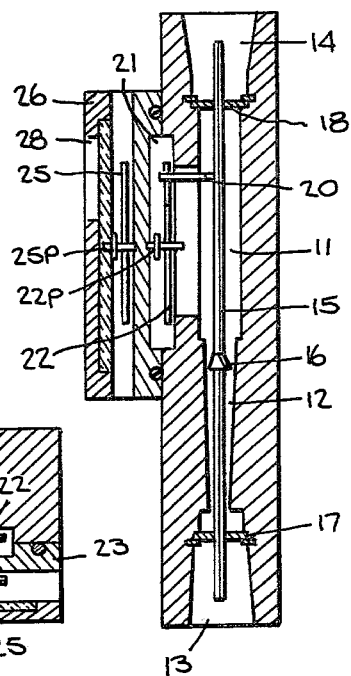
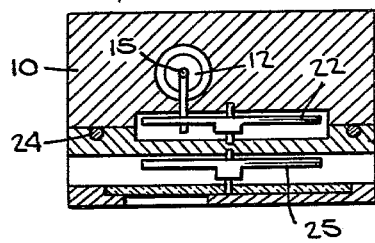
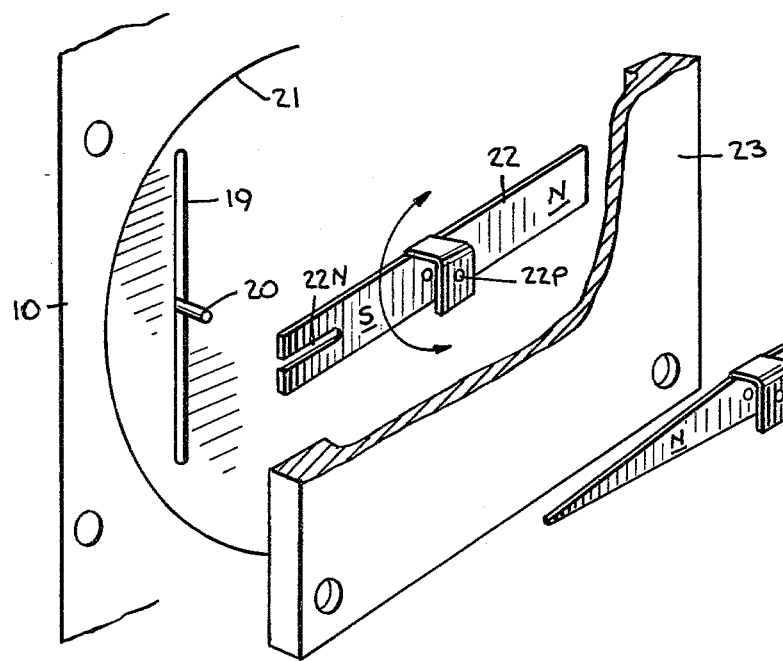
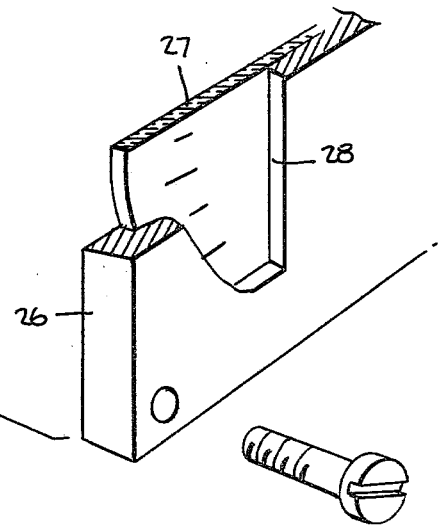

ARMORED ROTAMETER

BACKGROUND OF INVENTION

This invention relates generally to armored rotameters, and more particularly to a rotameter of this type provided with a magnetic follower adapted to convert the movement of the float therein to an external indication proportional to flow rate.

In a variable area flowmeter or rotameter for measuring flow rate, only the orifice area is varied as a function of flow, a constant pressure difference being maintained. The typical rotameter is constituted by an upright, tapered tube containing a weighted float which is raised to a position of equilibrium between the downward force of the float and the upward force of the fluid flowing past the float through the surrounding annular orifice. In a rotameter, the flow restriction is the area of the annular orifice, this area being enlarged as the float rises in the tapered tube. The pressure differential is fixed, this being determined by the weight of the float and the buoyant forces.

In many variable area flowmeter applications, it is necessary to translate the changing vertical position of the float within the flow tube into a corresponding external indication. Where, for example, the process fluid is opaque, the float cannot be seen through the transparent tube; hence direct visual indication along the tube is precluded. Mechanical coupling of the float to an external indicator is generally unsatisfactory, in that frictional and other loads thereby imposed on the float interfere with its free motion and distort the flow rate reading. In order to minimize loading the float, it is known to use a magnetic, non-mechanical coupling between the movable float in the flow tube and an external indicator.

The Metzger U.S. pat. No. 3,977,248 discloses an arrangement wherein the float in the rotameter tube is provided with a guided extension rod to which a bar magnet is attached, the bar magnet moving up and down in accordance with changes in the vertical float position. The bar magnet cooperates with a rotatable follower magnet mounted at one end of a shaft to which an indicating pointer is attached. The follower magnet is caused to rotate in a direction and to an extent which is a function of the bar magnet movement and hence of flow rate.

Ordinarily, variable area flowmeters make use of a thinwalled glass tube which is relatively fragile. Should this glass flow tube shatter in the course of operation, injuries may be inflicted on personnel in the vicinity thereof. And because the glass is under pressure, damage from the resultant explosion is not only from the glass fragments but also from the suddenly-released fluid which may be at high temperatures or contain dangerous chemicals.

To overcome the drawbacks inherent in rotameters having glass tubes and also to provide an effective magnetic follower, Instruction Bulletin 10A1227 (August 1976), published by Fischer & Porter of Warminster, Pa., discloses an armored purge meter which includes a stainless steel flow tube within which a tapered float is disposed. As fluid enters the bottom of the tube through a fixed inlet orifice, it lifts the float to a height in the tube proportional to flow rate. A permanent magnet embedded in the float attracts a magnet follower disposed in an external channel parallel to the metal flow tube. This follower moves up or down along the inside surface of a glass indicator scale and provides an indication of flow rate.

The magnetic bond between the float magnet depends on the strength of the magnet embedded in the float. As noted in the above-identified Instruction Bulletin, this bond can be lost because of a fluid surge in the pipeline, as a result of which the follower will fall to rest at a point below the zero line on the indicator scale. If one embeds a larger magnet in the float to improve the strength of the magnetic bond, this adds weight to the float to a degree which may render the rotameter ineffective at low flow rates.

Moreover, when measuring gas flow at low pressures in a low pressure range by means of a rotameter provided with a float having a magnet embedded therein, one often encounters the phenomenon of "float bounce." Because of the weight of the float resulting from the presence of the magnet, the float under low flow rate conditions will suddenly drop from its lifted position in the flow tube and be raised again by the gas flow. This up and down movement is repeated periodically, so that the float oscillates in the flow tube and makes it impossible to obtain a flow rate reading.

There is a growing demand in the industrial process control field for inexpensive, all-metal flowmeters to replace glass tube rotameters. While metal tube flowmeters of existing types are capable of handling liquid flows from 10 gallons per hour upward and gas flows from about 40 scfh upward, gas flowmeters in the lower ranges are generally unsatisfactory due to their high pressure drops and "float bounce" effects.

SUMMARY OF INVENTION

In view of the foregoing, the main object of this invention is to provide an armored rotameter having a magnet follower which links the float to an external pointer to indicate flow rate, the magnet follower providing a strong magnetic bond.

More particularly, it is an object of this invention to provide a rotameter of the above type which is especially useful in low flow, low pressure purge applications, the meter being free of "float bounce" effects.

A significant advantage of a rotameter in accordance with the invention is that it utilizes the strength of a large magnet without adding the weight of the magnet to the float as in prior arrangements, the reduced float weight permitting much lower flow ranges than presently possible in an all-metal meter with a magnetic follower. In practice, the rotameter will extend the measurable minimum flow rate to as low as about 8 scfh of gas metered at a pressure of 14.7 psia at 70° F., without being subject to float bounce at this low pressure.

Also an object of this invention is to provide an efficient all-metal rotameter which can be mass-produced at relatively low cost.

Briefly stated, these objects are attained in a rotameter having a metal meter body provided with a bore defining a vertical flow tube having a lower inlet into which a fluid to be metered is admitted and an upper outlet from which the fluid is discharged. A float is disposed in the flow tube having a guided stem.

Formed in the meter body is a vertical slot which lies in registration with the float stem, a pin attached to the stem and extending laterally therefrom projecting through the slot whereby as the float moves up and down the flow tube, the pin rides up and down the slot. The pin is coupled to one end of a bar magnet link which is swingable above a center pivot, the link being caused by the pin to swing to an extent and in a direction in accordance with the float movement.

The float and the link are sealed by a pressure plate secured to the meter body. External to the pressure plate and parallel to the link is a bar magnet pointer that is swingable about a center pivot in axial alignment with the link pivot, the link and the pointer being in polar opposition and therefore in attractive relation, whereby as the link turns, its movement is followed by the pointer to provide a flow rate indication on a scale associated therewith.

Overlying the pressure plate is a cover plate having a window therein provided with a transparent scale through which the pointer is made visible to afford flow rate indications.

OUTLINE OF DRAWINGS

For a better understanding of the invention as well as other objects and further features thereof, reference is made to the following detailed description to be read in conjunction with the accompanying drawings, wherein:

FIG. 1 is a front view of a rotameter in accordance with the invention, with its cover plate partially cut away to expose the link magnet of the follower;

FIG. 2 is a section taken longitudinally through the rotameter;

FIG. 3 is a section taken transversely through the rotameter;

FIG. 4 is a front view of the pointer scale of the rotameter; and

FIG. 5 is an exploded view of the magnetic follower components of the rotameter.

DESCRIPTION OF INVENTION

Referring now to the figures of the drawing, there is shown an armored rotameter which includes a magnetic follower in accordance with the invention, the meter operating on the variable area principle to sense and indicate the flow rate of fluid passing therethrough.

The rotameter includes a meter body 10 made of a block of a metal, such as stainless steel, which is non-reactive with the fluid to be metered. Block 10 has a bore therein defining a cylindrical flow section 11 and a tapered flow tube section 12 whose lower end communicates with an inlet 13 into which the fluid to be metered is admitted through a suitable fitting. The upper end of flow tube section 12 communicates through cylindrical section 11 with an outlet 14 from which the fluid is discharged, again the means of a suitable fitting.

Disposed coaxially in the bore of body 10 is a long stem 15 having a conical float 16 formed therein which lies within flow tube section 12. The stem is guided at its lower end by a snap ring 17 seated within inlet 13, and at its upper end by a snap ring 18 seated within outlet 14. Formed in the wall of a meter body 10 is a slot 19 (see FIG. 5) which communicates with cylindrical section 11 and lies in registration with stem 15. Projecting through slot 19 is a pin 20. This pin extends laterally from stem 15 and is attached thereto so that as float 16 causes stem 15 to move axially in response to changes in flow rate, pin 20 is caused to ride up and down slot 19 accordingly.

The front face of the meter body is provided with a circular well or depression 21 which encircles slot 19. Disposed within well 21 is a bar magnet 22 serving as the link of a magnetic follower, the link being swingable about a center point pivot 22P. One end of link 22 is provided with a notch 22N within which float pin 20 is received, thereby operatively coupling stem 15 to link 22.

Thus when float pin 20 rides up and down slot 19 as a function of the changing flow rate, this movement causes link 22 to swing about pivot 22P in a direction and extent reflecting the existing flow rate, thereby converting the linear movement of the float into a corresponding angular displacement.

Well 21 is covered by a non-magnetic pressure plate 23. An O-ring 24 or similar gasket is provided to prevent fluid leakage, thereby sealing slot 19, pin 20 and link 22 within the well. External to pressure plate 23 is a bar magnet pointer 25 that is parallel to link 22 and is swingable about a center point pivot 25P in axial alignment with link pivot 22P.

As shown by the north and south poles N and S of link 22 and pointer 25, these parallel bar magnets are in polar opposition, hence in magnetically-attractive relation; as a consequence of which pointer 25 is magnetically bonded to link 22 and precisely follows the link movement.

Superposed over pressure plate 23 and secured thereto is a rectangular cover plate 26 having a recess in its rear face to accommodate a transparent scale 27 which cooperates with pointer 25. Cover 26 is provided with a semi-circular port 28 to expose transparent scale 17 and the pointer associated therewith to an observer.

Link magnet 22 is a large magnet, as compared to magnets of the type heretofore embedded in floats. Yet this large magnet, because it is balanced with respect to its center point, does not add weight to the float, thereby making the float responsive in the low flow rate range. On the other hand, because the mass distribution of link magnet 22 is such that a large portion thereof is removed from its pivot point, this magnet has a relatively high moment of inertia. As a consequence of this link inertia, "float bounce" effects are inhibited.

In practice, the balance of the link may be made such as to cause it to be slightly heavier at its notched end. This serves to impose a slight downward pressure on the float, so that there is no danger of the balance crossing over the link center line to produce an upwardly-directed force on the float.

Also, in practice, pointer 25 may be used in conjunction with an electro-optical sensor constituted by a light beam and a photodetector, the pointer intercepting the beam to actuate an alarm when the pointer goes above a safe flow rate limit. Or the photodetectors may be used in a stacked array to serve as a float position-indicator.

While there has been shown and described a preferred embodiment of an armored rotameter in accordance with the invention, it will be appreciated that many changes and modifications may be made therein without, however, departing from the essential spirit thereof.

I claim:

1. An armored rotameter capable of accurately measuring low flow rates, the rotameter comprising:
   A. a metal body provided with a bore defining a vertical flow tube, a lower inlet thereto into which a fluid to be metered is admitted and an upper outlet from which the fluid is discharged;
   B. a float disposed in the flow tube and having a guided stem which includes a pin extending laterally therefrom, the pin projecting through a slot formed in the front face of the meter body, the pin riding up and down the slot as the float moves up and down the tube as a function of flow rate;

C. a link magnet external to the meter body and swingable about a center pivot, the pin being coupled to one end of the link to cause the link magnet to swing in a direction and to an extent in accordance with float movement;

D. a non-magnetic pressure plate secured to the front face of the meter body to seal said slot and link; and E. a pointer magnet external to the pressure plate and parallel to the link, said pointer magnet being swingable about a center pivot in axial alignment with the link magnet pivot and being in magnetically-attractive relation to the link magnet, whereby as the link magnet swings, its movement is followed by the pointer magnet to indicate flow rate.

2. A rotameter as set forth in claim 1, wherein the link and pointer magnets are in bar magnet form.

3. A rotameter as set forth in claim 1, wherein said meter body is formed of stainless steel.

4. A rotameter as set forth in claim 1, wherein said pressure plate has a cover plate superposed thereover which includes a transparent scale in cooperative relation with the pointer magnet.

5. A rotameter as set forth in claim 2, wherein said pointer magnet is provided with an end notch through which the pin projects to effect said coupling.

6. A rotameter as set forth in claim 5, wherein the notched end of the pointer magnet is slightly heavier than the other end thereof to impose a slight force on said float.

7. A rotameter as set forth in claim 1, wherein said stem is guided by a ring in the inlet and by a ring in the outlet.

8. A rotameter as set forth in claim 1, wherein said front face of the body has a circular depression therein to accommodate the link magnet.

* * * * *